United States Patent
Ishikawa

(10) Patent No.: US 7,772,793 B2
(45) Date of Patent: Aug. 10, 2010

(54) RAINDROP DETECTING DEVICE AND METHOD OF SELECTING WIPING MODE FOR VEHICLE

(75) Inventor: Junichi Ishikawa, Kariya (JP)

(73) Assignee: Denso Corporation, Kariya (JP)

( * ) Notice: Subject to any disclaimer, the term of this patent is extended or adjusted under 35 U.S.C. 154(b) by 313 days.

(21) Appl. No.: 11/896,539

(22) Filed: Sep. 4, 2007

(65) Prior Publication Data

US 2008/0157704 A1    Jul. 3, 2008

(30) Foreign Application Priority Data

Dec. 28, 2006   (JP) .............................. 2006-355965

(51) Int. Cl.
*H02P 1/04*       (2006.01)

(52) U.S. Cl. ...................................... 318/483; 318/445
(58) Field of Classification Search .................. 318/483, 318/445

See application file for complete search history.

(56) References Cited

U.S. PATENT DOCUMENTS

| 4,710,878 | A  | * | 12/1987 | Iyoda ........................... 701/36 |
| 6,657,410 | B1 | * | 12/2003 | Berger et al. ................. 318/483 |
| 7,009,356 | B2 | * | 3/2006  | Tanida ......................... 318/483 |
| 7,098,618 | B2 | * | 8/2006  | Morishita .................... 318/444 |
| 7,235,944 | B2 | * | 6/2007  | Morishita .................... 318/483 |
| 7,466,097 | B2 | * | 12/2008 | Kokuryo et al. ............. 318/444 |

FOREIGN PATENT DOCUMENTS

| EP | 1 623 896    | 2/2006 |
| JP | 2006-036075  | 2/2006 |

* cited by examiner

*Primary Examiner*—Bentsu Ro
*Assistant Examiner*—David S Luo
(74) *Attorney, Agent, or Firm*—Nixon & Vanderhye P.C.

(57) ABSTRACT

A raindrop detecting device for detecting a raindrop amount on a windshield of a vehicle and selecting a wiping mode of a wiper based on the detected raindrop amount includes a controller for lowering the wiping mode when the detected raindrop amount is kept to be smaller than a mode-keep threshold while the wiper performs a predetermined number of wiping operations. The controller changes the predetermined number of wiping operations based on at least one of a sensitivity data of a user of the vehicle and a rainfall block data relative to the vehicle.

22 Claims, 9 Drawing Sheets

| MAP 1 | HI ⇒ STOP<br>LO ⇒ STOP<br>INT ⇒ STOP | HI (N=4+B) → LO (N=1) → STOP<br>LO (N=3+B) → INT-A (N=1) → STOP<br>INT-B (N=2+B) → INT-C (N=1) → STOP |
|---|---|---|
| MAP 3 | HI ⇒ STOP<br>LO ⇒ STOP<br>INT ⇒ STOP | HI (N=4+A) → LO (N=1) → STOP<br>LO (N=3+A) → INT-A (N=1) → STOP<br>INT-B (N=2+A) → INT-C (N=1) → STOP |
| MAP 5 | HI ⇒ STOP<br>LO ⇒ STOP<br>INT ⇒ STOP | HI (N=4) → LO (N=1) → STOP<br>LO (N=3) → INT-A (N=1) → STOP<br>INT-B (N=2) → INT-C (N=1) → STOP |

| MAP 2 | HI ⇒ STOP<br>LO ⇒ STOP<br>INT ⇒ STOP | HI (N=4+B−D) → LO (N=1) → STOP<br>LO (N=3+B−D) → INT-A (N=1) → STOP<br>INT-B (N=2+B−D) → INT-C (N=1) → STOP |
|---|---|---|
| MAP 4 | HI ⇒ STOP<br>LO ⇒ STOP<br>INT ⇒ STOP | HI (N=4+A−E) → LO (N=1) → STOP<br>LO (N=3+A−E) → INT-A (N=1) → STOP<br>INT-B (N=2+A−E) → INT-C (N=1) → STOP |
| MAP 6 | HI ⇒ STOP<br>LO ⇒ STOP<br>INT ⇒ STOP | HI (N=4−F) → LO (N=1) → STOP<br>LO (N=3−F) → INT-A (N=1) → STOP<br>INT-B (N=2−F) → INT-C (N=1) → STOP |

RAINDROP DETECTING DEVICE AND METHOD OF SELECTING WIPING MODE FOR VEHICLE

CROSS REFERENCE TO RELATED APPLICATION

This application is based on Japanese Patent Application No. 2006-355965 filed on Dec. 28, 2006, the disclosure of which is incorporated herein by reference in its entirety.

BACKGROUND OF THE INVENTION

1. Field of the Invention

The present invention relates to a raindrop detecting device and a method of selecting wiping mode for a vehicle.

2. Description of Related Art

A wiper wipes raindrop on a windshield, e.g., front windshield, of a vehicle, and a wiper automatic control apparatus automatically controls the wiper. The wiper automatic control apparatus includes a raindrop detecting device having a light-emitting element and a light-receiving element. The light-emitting element emits light, and the windshield reflects the emitted light. The reflected light is introduced into the light-receiving element, and the light-receiving element detects an amount of light received by the light-receiving element. Thus, raindrop amount can be detected, because the amount of the received light is changed in accordance with the raindrop amount. Further, a wiping mode of the wiper can be selected based on the detected raindrop amount.

EP 1 623 896 A1 (corresponding to JP-A-2004-338526) discloses a wiper automatic control apparatus having a raindrop detecting device. The wiper automatic control apparatus is required to smoothly correspond to a rapid change of a rainfall condition caused when a vehicle passes through a tunnel, for example.

The wiper automatic control apparatus determines that the vehicle enters a rainfall-blocked area, i.e., the tunnel. In response to the determination, the wiper automatic control apparatus sets the wiping mode low, relative to a rainfall having a level lower than a predetermined level. In contrast, the wiper automatic control apparatus sets the wiping mode high, relative to a rainfall having a level equal to or higher than the predetermined level.

While a subject vehicle travels through the tunnel, a front vehicle traveling in front of the subject vehicle rolls up minute water drops toward a front windshield of the subject vehicle. The rolled-up minute water drops adhere onto the front windshield of the subject vehicle, and affect a vision of a driver driving the subject vehicle. Therefore, the adhering water drops have to be detected and wiped by a wiper of the subject vehicle.

However, the rolled-up water drop has a relatively small diameter, and an amount of the rolled-up water drops is relatively small. Therefore, the wiping mode is not required to be high for a certain time before the vision of the driver is affected. If the wiping mode is set high relative to the rolled-up water drops, movement of the wiper may be troublesome for the driver before the vision of the driver is affected. That is, in the tunnel, the wiper has to wipe the adhering water drops, but the wiping mode of the wiper has to be set lower.

In contrast, when the subject vehicle travels out of the tunnel, the subject vehicle is exposed to an approximately the same amount of rainfall before the subject vehicle enters the tunnel. Therefore, the wiping mode has to be set similar to that before the subject vehicle enters the tunnel. However, the driver may feel the rainfall to become heavier when the subject vehicle travels out of the tunnel, because the vision of the driver is better in the tunnel due to its rainfall-blocked condition. Therefore, the wiping mode may have to be set higher when the subject vehicle travels out of the tunnel.

However, if the rainfall amount is small when the subject vehicle travels out of the tunnel, the wiping mode may not have to be set higher, because it takes a relatively long time before the vision of the driver is affected. That is, the wiper automatic control apparatus is required to smoothly correspond to the rapid change of the rainfall condition caused when the vehicle passes through the rainfall-blocked area.

Here, when a size of the raindrop detecting device is relatively small, it may be difficult for the small-sized raindrop detecting device to detect raindrop on the whole windshield. Further, in a case where a sensitivity controller provides a sensitivity data of a user of the vehicle to the raindrop detecting device, when the sensitivity controller is set to have a high sensitivity, the wiping mode is easily set high even if the rainfall amount is relatively small, for example. For a variety of users having different sensitivities, the sensitivity controller adjusts a relationship between the detected raindrop amount and the wiping mode.

When the sensitivity controller is set to have the high sensitivity, the wiper is moved at a higher speed, so that a time allowed to detect the raindrop amount becomes shorter. Thereby, it may be more difficult for the raindrop detecting device to accurately detect the raindrop amount. In this case, the wiping mode may be unnecessarily lowered, and movement of the wiper may become unstable.

In order to prevent this disadvantage, the wiping mode is set to be lowered when any raindrop is not detected while the wiper performs a predetermined number of wiping operations. That is, the wiping mode is lowered when the detected raindrop amount is kept to be smaller than a predetermined threshold. Alternatively, an average of the detected raindrop amounts may be calculated after the wiper performs the predetermined number of wiping operations, and the wiping mode may be lowered by comparing the calculated average with a predetermined threshold.

In these cases, although the wiping operation can be stable, responsivity for lowering the wiping mode may be delayed. Further, the responsivity depends on a sense of the user, e.g., driver, of the vehicle so that the responsivity is difficult to be determined to be fast or slow.

In contrast, when the vehicle enters the rainfall-blocked area, the responsivity for lowering the wiping mode is required to be fast, because the rainfall is blocked in the tunnel, for example.

SUMMARY OF THE INVENTION

In view of the foregoing and other problems, it is an object of the present invention to provide a raindrop detecting device and a method of selecting wiping mode for a vehicle.

According to a first example of the present invention, a raindrop detecting device for detecting a raindrop amount on a windshield of a vehicle and selecting a wiping mode of a wiper based on the detected raindrop amount includes a controller for lowering the wiping mode when the detected raindrop amount is kept to be smaller than a mode-keep threshold while the wiper performs a predetermined number of wiping operations. The controller changes the predetermined number of wiping operations based on at least one of a sensitivity data of a user of the vehicle and a rainfall block data relative to the vehicle.

According to a second example of the present invention, a raindrop detecting device for detecting a raindrop amount on a windshield of a vehicle and selecting a wiping mode of a wiper based on the detected raindrop amount includes a controller for calculating an average of a predetermined number of the detected raindrop amounts, and lowering the wiping mode when the average is smaller than a mode-keep threshold. The controller changes the predetermined number of the detected raindrop amounts based on a sensitivity data of a user of the vehicle and a rainfall block data relative to the vehicle.

According to a third example of the present invention, a method of selecting a wiping mode of a wiper for a vehicle includes a detecting, a lowering and a changing. In the detecting, a raindrop amount on a windshield of the vehicle is detected. In the lowering, the wiping mode is lowered when the detected raindrop amount is kept to be smaller than a mode-keep threshold while the wiper performs a predetermined number of wiping operations. In the changing, the predetermined number of wiping operations is changed based on at least one of a sensitivity data of a user of the vehicle and a rainfall block data relative to the vehicle.

Accordingly, movement of the wiper can be stable, and the wiping mode of the wiper can be suitable for the user of the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
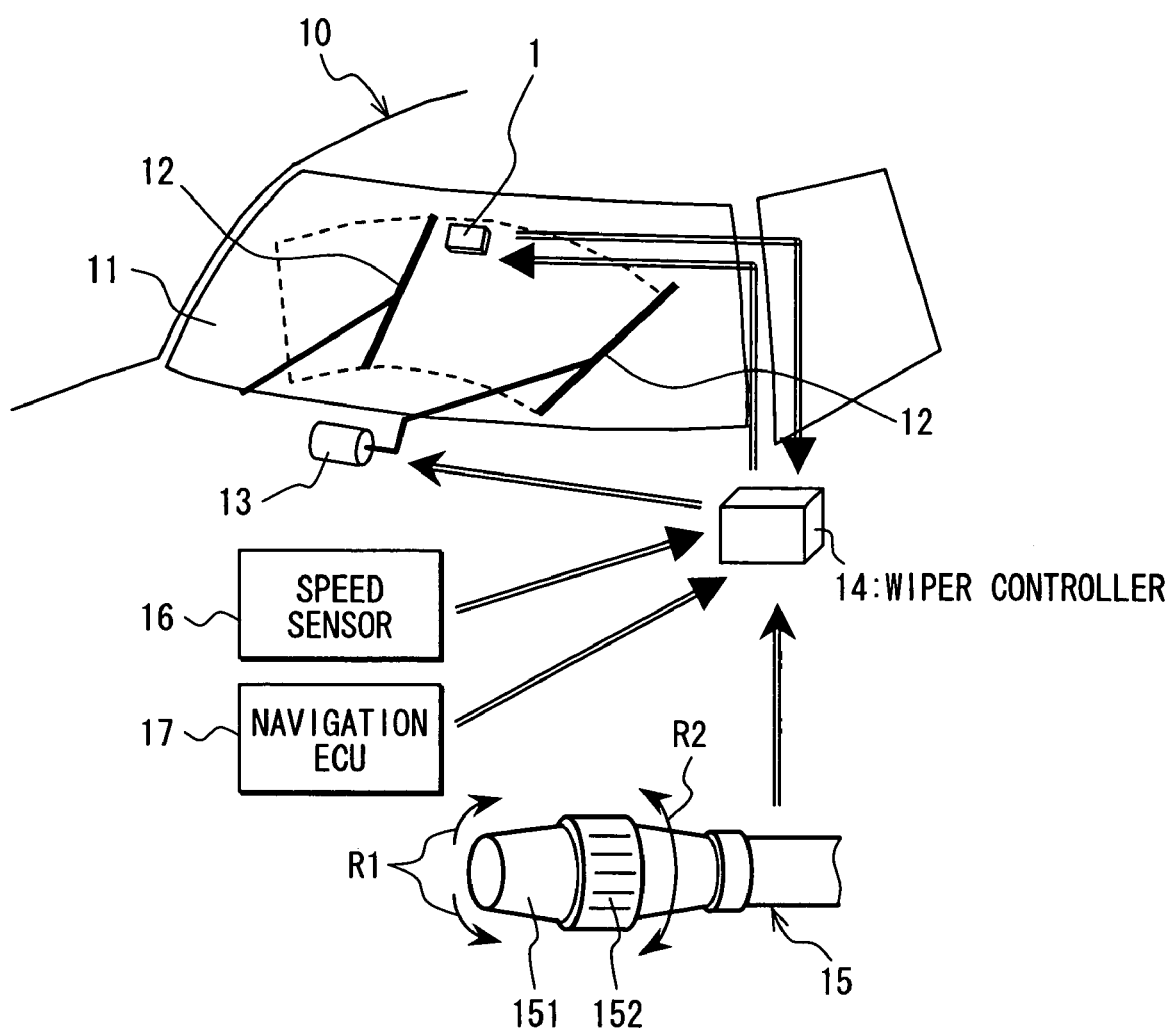
FIG. 1 is a schematic diagram showing a raindrop detecting device according to an embodiment of the present invention.

As shown in FIG. 1, a wiper automatic control apparatus includes a rain sensor 1, i.e., raindrop detecting device, and a wiper controller 14. The wiper automatic control apparatus activates a wiper 12 for wiping raindrop adhering onto a front windshield 11 of a vehicle 10. The rain sensor 1 detects a raindrop amount on the front windshield 11, and selects a wiping mode of the wiper 12 based on the detected raindrop amount. The rain sensor 1 inputs data into a wiper motor 13 through the wiper controller 14, in order to automatically control the wiper 12. That is, the rain sensor 1 outputs a driving signal for driving the wiper 12 into the wiper controller 14, and the wiper controller 14 activates the wiper motor 13 to drive the wiper 12 in response to the driving signal output from the rain sensor 1.

The data needed for automatically controlling the wiper 12 is constructed by an auto/manual switch data output from a mode switch 151, a sensitivity volume data output from a sensitivity volume switch 152, i.e., sensitivity adjuster, a vehicle speed data output from a speed sensor 16, a rainfall block data, e.g., tunnel data, output from a navigation electronic control unit (ECU) 17 and the like. These data may be input into the rain sensor 1 without passing through the wiper controller 14.

A wiper switch 15 includes the mode switch 151 and the sensitivity volume switch 152. When the mode switch 151 is operated in an arrow direction R1, the wiper 12 is switched among a stop mode, an auto mode and a manual mode. The switch data indicative of a selected mode is input into the rain sensor 1 from the mode switch 151 through the wiper controller 14.

When the auto mode is selected through the mode switch 151, the sensitivity volume switch 152 is used for adjusting a relationship between a raindrop amount detected by the rain sensor 1 and a wiping mode. That is, a wiping frequency, i.e., wiping number per unit time, of the wiper 12 is changed relative to the same raindrop amount based on the sensitivity volume data. The wiping mode of the wiper 12 has an intermittent (INT) level, a continuous low (LO) level and a continuous high (HI) level, and the wiping frequency of the wiper 12 becomes larger in this order. When the sensitivity volume switch 152 is operated in an arrow direction R2, a wiping sensitivity is switched among a maximum level (MAX), a middle level (MID) and a minimum level (MIN). The sensitivity volume data indicative of a selected level is input into the rain sensor 1 from the sensitivity volume switch 152 through the wiper controller 14.

Figure 2:
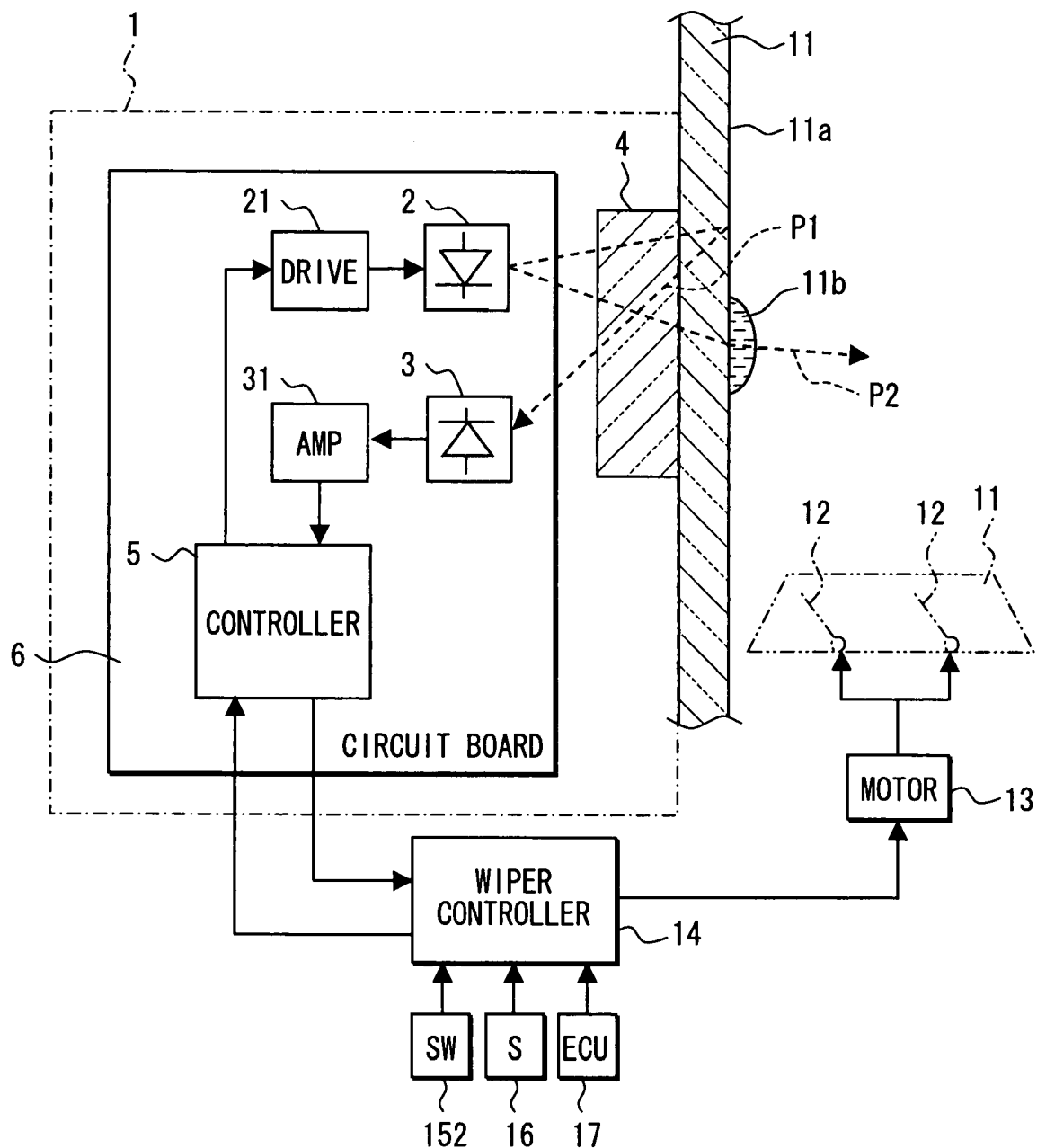
FIG. 2 is a schematic diagram showing a construction of the raindrop detecting device.

As shown in FIG. 2, the rain sensor 1 includes a light-emitting diode 2 (LED), a photo diode 3, a prism 4 and a controller 5. The controller 5 is constructed by a CPU and the like, and drives the LED 2 by activating a LED driving circuit 21. Thereby, the LED 2 emits light toward a glass face 11a of the front windshield 11 through the prism 4. The glass face 11a of the front windshield 11 reflects the emitted light, and the photo diode 3 receives the reflected light through the prism 4. The photo diode 3 outputs a signal corresponding to an amount of the received light into an amplification circuit 31. The amplification circuit 31 amplifies the signal, and the amplified signal is input into the controller 5 as a raindrop amount detected by the rain sensor 1.

Here, when any raindrop does not adhere onto the glass face 11a corresponding to a light path P1, almost all of light having the light path P1 is reflected by the glass face 11a, and the reflected light is received by the photo diode 3. In contrast, when a raindrop 11b adheres onto the glass face 11a corresponding to a light path P2, light having the light path P2 passes through the glass face 11a and the raindrop 11b, so that the emitted light is not received by the photo diode 3. Therefore, when an amount of the adhering raindrop is increased in a detection area of the rain sensor 1, the amount of light received by the photo diode 3 is decreased. Thereby, the signal output from the photo diode 3 is lowered. When the signal output from the photo diode 3 is lowered, the raindrop amount detected by the rain sensor 1 is increased.

The controller 5 is supplied with data of the raindrop amount output from the photo diode 3, the sensitivity volume data output from the sensitivity volume switch 152, the vehicle speed data output from the speed sensor 16, the rainfall block data output from the navigation ECU 17 and the like. Then, the controller 5 selects the wiping mode, and outputs a driving signal for driving the wiper 12 into the wiper controller 14.

The LED 2, the LED driving circuit 21, the photo diode 3, the amplification circuit 31 and the controller 5 are mounted to a circuit board 6. The circuit board 6 and the prism 4 are disposed in a protection case (not shown) to construct the rain sensor 1.

Figure 3A:
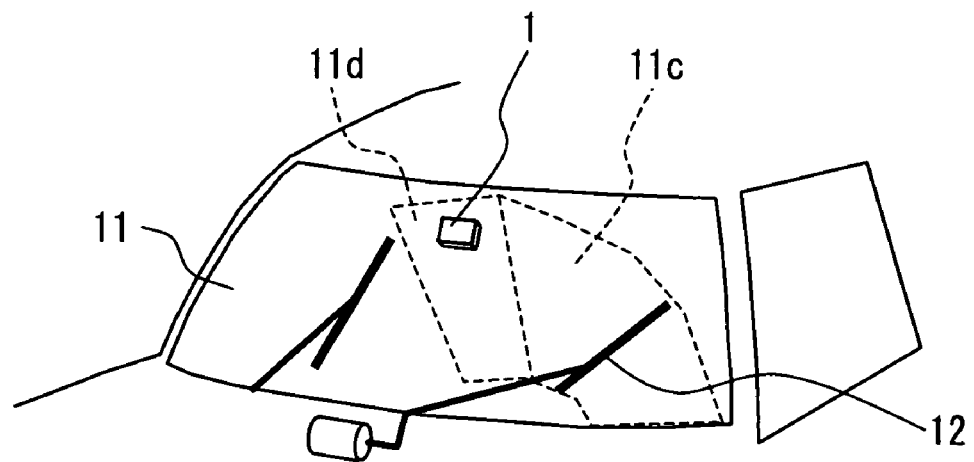
FIG. 3A is a schematic diagram showing a position relationship between the raindrop detecting device and a wiper.
Figure 3B:
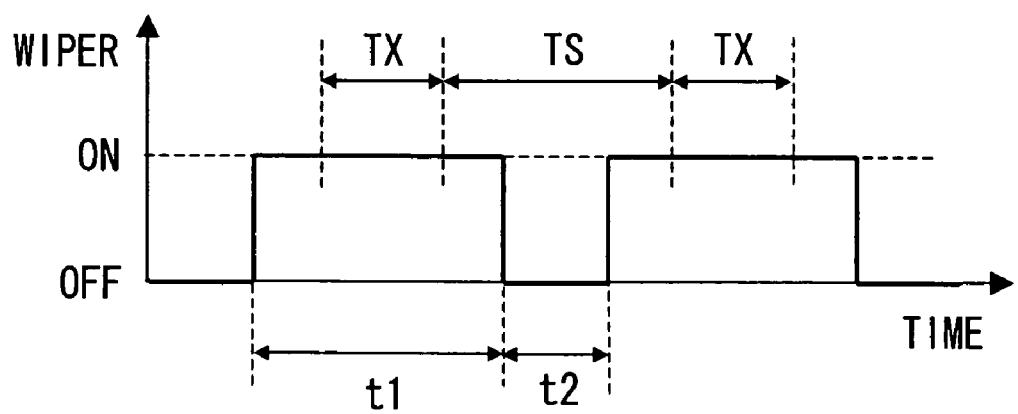
FIG. 3B is a graph showing a relationship between a detection enabling time period and a detection disabling time period.

As shown in FIG. 3A, the wiper 12 wipes a wiping area 11c, 11d of the front windshield 11. While the wiper 12 wipes the wiping area 11d, the rain sensor 1 cannot detect the raindrop amount. As shown in FIG. 3B, the wiper 12 wipes the wiping area 11c, 11d for a time period t1, and stops the wiping for a time period t2. The time period t1 and the time period t2 are alternately repeated to perform wiping operations of the wiper 12.

The rain sensor 1 is allowed to detect the raindrop amount for a detection enabling time period TS, and is not allowed to detect the raindrop amount for a detection disabling time period TX. The enabling time period TS is constructed by the time period t2 and a part of the time period t1 for which the wiper 12 wipes the wiping area 11c. The disabling time period TX is constructed by a part of the time period t1 for which the wiper 12 wipes the wiping area 11d. That is, the rain sensor 1 detects the raindrop amount in the enabling time period TS every wiping operation. The enabling time period TS becomes longer in an order of the HI level, the LO level and the INT level of the wiping mode.

Even if the enabling time period TS is relatively short, the small-sized rain sensor 1 secures to detect raindrop on the whole front windshield 11. Therefore, the controller 5 lowers the wiping mode, when the detected raindrop amount is kept to be smaller than a first mode-keep threshold while the wiper 12 performs a predetermined number N of the wiping operations.

Further, the controller 5 is supplied with the sensitivity volume data adjusted by a user of the vehicle 10 through the sensitivity volume switch 152, and changes the predetermined number N of the wiping operations based on the sensitivity volume data. Here, the sensitivity volume data represents a sense of the user. Because responsivity for lowering the wiping mode can be changed by the predetermined number N of the wiping operations, the responsivity for lowering the wiping mode can be changed in accordance with the sense of the user.

Figure 4:
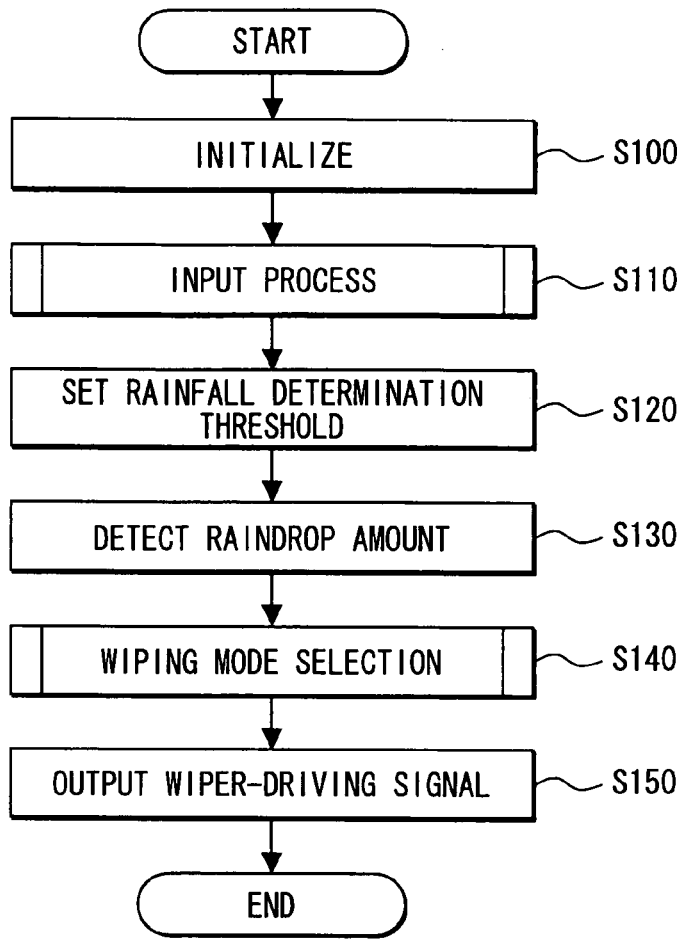
FIG. 4 is a flow chart showing a main routine of a wiper driving process.

Next, when the auto mode is selected, a wiper driving process to be performed by the controller 5 of the rain sensor 1 will be described with reference to FIGS. 4, 5, 6, 7 and 8. As shown in FIG. 4, a RAM of the controller 5 is initialized at step S100, and an input process is performed at step S110.

Figure 5:
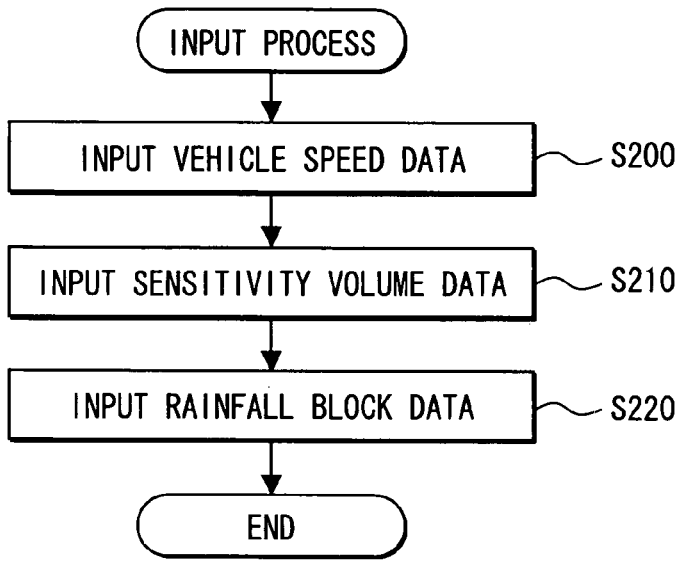
FIG. 5 is a flow chart showing a subroutine of an input process in FIG. 4.

The input process of S110 is constructed by step S200, S210 and S220, which are shown in FIG. 5. The speed sensor 16 inputs the vehicle speed data at S200. Then, the sensitivity volume switch 152 inputs the sensitivity volume data at S210. The navigation ECU 17 inputs the rainfall block data at S220. Thus, the input process of S110 is finished.

Figure 6:
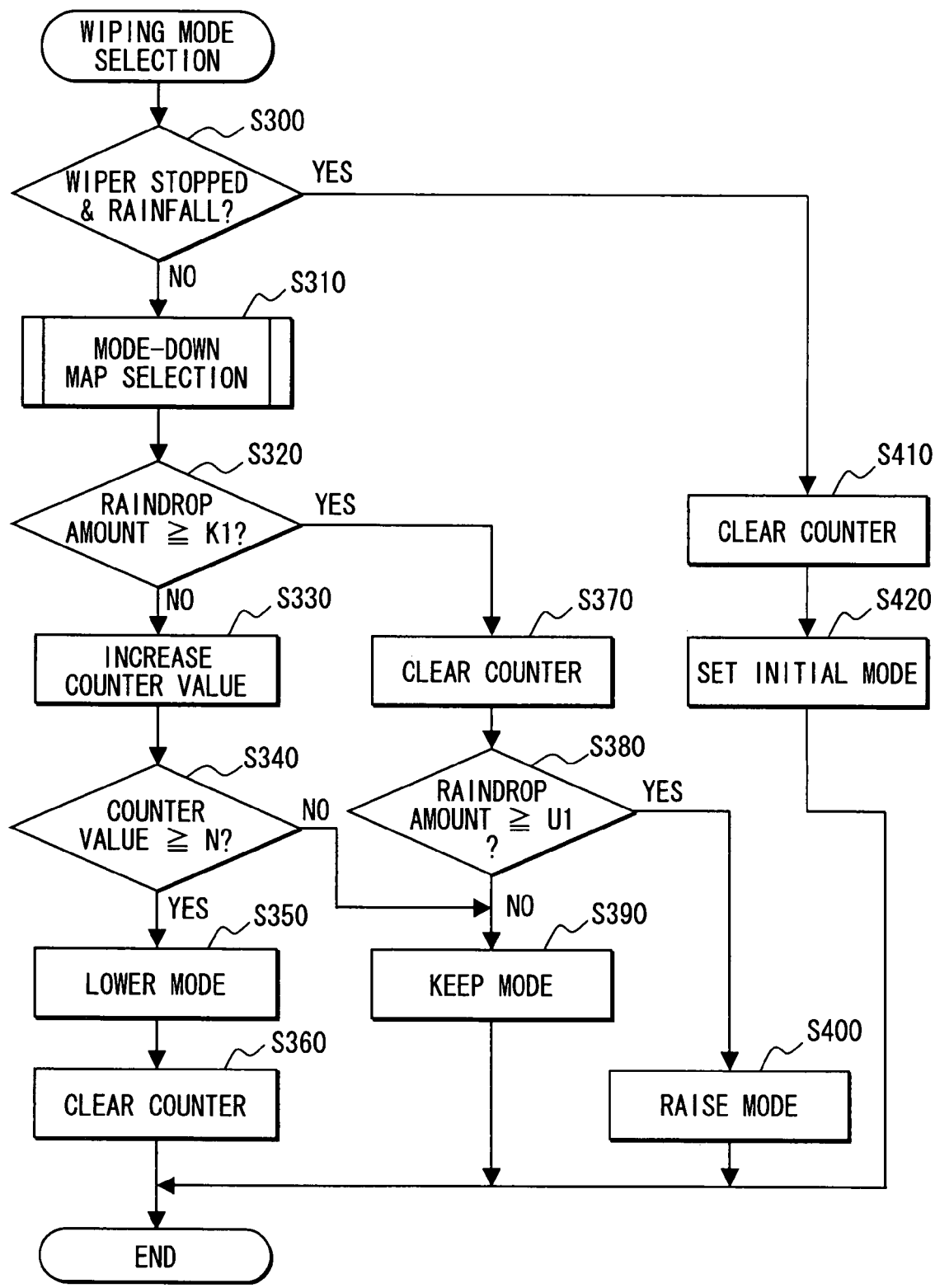
FIG. 6 is a flow chart showing a subroutine of a wiping mode selection in FIG. 4.

At step S120 in FIG. 4, a rainfall determination threshold to be used at step S300 in FIG. 6 is set. Due to the rainfall determination threshold, the wiping mode can be selected in accordance with the detected raindrop amount, for example.

Further, a first mode-keep threshold K1 to be used at step S320 in FIG. 6, and a first mode-up threshold U1 to be used at step S380 in FIG. 6 are also set, at S120. Here, the rainfall determination threshold, the first mode-keep threshold K1 and the first mode-up threshold U1 are changed by the data input in the input process of S110.

Then, at step S130, the raindrop amount on the front windshield 11 is detected. After S130, a wiping mode selection is performed at step S140. The wiping mode selection of S140 is constructed by step S300-S420 in FIG. 6.

At step S300, the wiper 12 is determined to be stopped or not, based on a wiper motor operation signal output from the wiper controller 14, for example. Further, the controller 5 determines that it is raining or not by comparing the detected raindrop amount with the rainfall determination threshold, for example, at S300.

When the wiper 12 is determined to be operating, or when the controller 5 determines that it is not raining while the wiper 12 is determined to be stopped (NO at S300), a mode-down map selection is performed at step S310. The mode-down map selection of S310 is constructed with step S500, S510, S520 and S530, which are shown in FIG. 7.

At step S500, the sensitivity volume data output from the sensitivity volume switch 152 into the controller 5 is determined to be the MAX level, the MID level or the MIN level. When the MAX level is selected, MAP1 is selected as a mode-down map at step S510. When the MID level is selected, MAP3 is selected as the mode-down map at step S520. When the MIN level is selected, MAP5 is selected as the mode-down map at step S530.

Figures 7, 8:
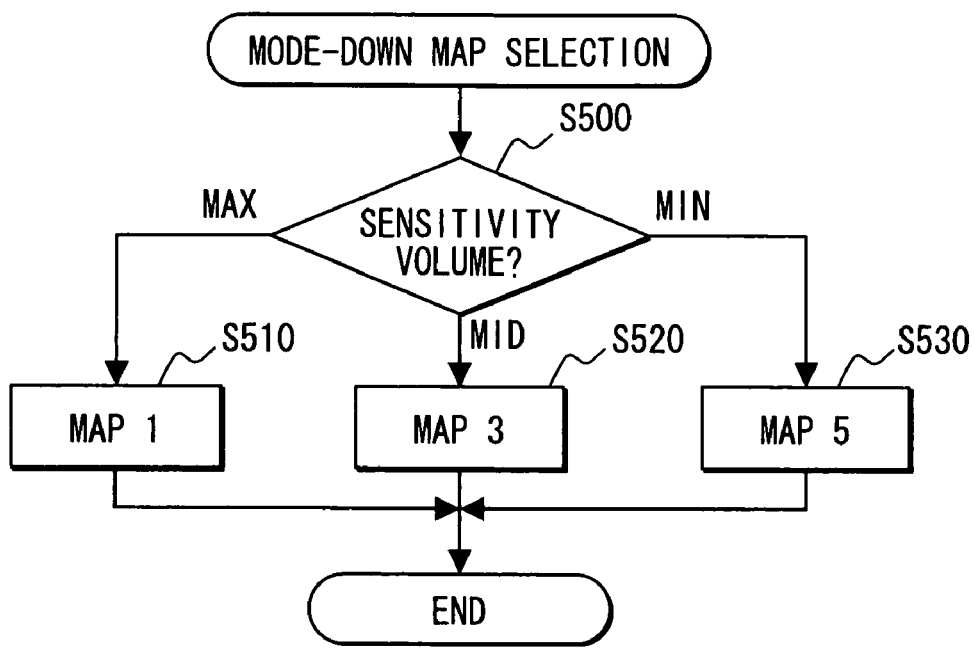
FIG. 7 is a flow chart showing a subroutine of a mode-down map selection in FIG. 6.
FIG. 8 is a diagram showing a mode-down map.

As shown of MAP5 in FIG. 8, in order to stop the wiper 12 from the HI level, the predetermined number N of the wiping operations at the HI level is set to four to change the wiper 12 to the LO level, and the predetermined number N of the wiping operations at the LO level is set to one to stop the wiper 12. In order to stop the wiper 12 from the LO level, the predetermined number N of the wiping operations at the LO level is set to three to change the wiper 12 to an INT-A level, and the predetermined number N of the wiping operations at the INT-A level is set to one to stop the wiper 12. In order to stop the wiper 12 from the INT level, the predetermined number N of the wiping operations at an INT-B level is set to two to change the wiper 12 to an INT-C level, and the predetermined number N of the wiping operations at the INT-C level is set to one to stop the wiper 12. Here, the INT level has the INT-A level, the INT-B level and the INT-C level, and the wiping frequency becomes smaller in this order.

Thus, the predetermined number N of the wiping operations set for lowering the wiping mode from the LO level is made smaller than that from the HI level. Further, the predetermined number N of the wiping operations set for lowering the wiping mode from the INT level is made smaller than that from the LO level. Because the enabling time period TS becomes longer in the order of the HI level, the LO level and the INT level, raindrop on the whole front windshield 11 secures to be detected even if the predetermined number N of the wiping operations is set smaller in the above-described order.

In MAP5 of FIG. 8, the predetermined number N of the wiping operations at the HI level is set to four to change the wiper 12 to the LO level. In contrast, according to MAP3 shown in FIG. 8, the predetermined number N of the wiping operations at the HI level is set to four plus an integer A (4+A) to change the wiper 12 to the LO level. Further, according to MAP1 shown in FIG. 8, the predetermined number N of the wiping operations at the HI level is set to four plus an integer B (4+B) to change the wiper 12 to the LO level. Here, the integer A and the integer B are set to have a relationship of B>A>0, for example. Thus, the controller 5 is constructed such that the predetermined number N of the wiping operations set for lowering the wiping mode from the HI level is increased as the sensitivity volume is switched from the MIN level to the MID level, or from the MID level to the MAX level.

Because the sensitivity volume data adjusted by the user represents the sense of the user as described above, the predetermined number N of the wiping operations can be changed in accordance with the sense of the user, due to the mode-down map selection of S310 in FIG. 6.

After the mode-down map selection of S310 is finished, the raindrop amount is determined to be equal to or larger than a predetermined amount for keeping the wiping mode or not, at step S320. Specifically, the detected raindrop amount is determined to be equal to or larger than the first mode-keep threshold K1 or not, at step S320.

When the detected raindrop amount is determined to be smaller than the first mode-keep threshold K1 (NO at S320), a mode-down counter increases its counter value, at step S330. The increasing of the counter value corresponds to a single wiping operation of the wiper 12.

At step S340, the counter value of the mode-down counter is determined to be equal to or larger than the predetermined number N of the wiping operations or not, which has been selected at step S310. When the counter value of the mode-down counter is determined to be equal to or larger than the predetermined number N (YES at S340), the wiping mode is lowered at step S350.

For example, in a case where the wiper 12 operates at the HI level, when MAP1 is selected at S310, the predetermined number N is set as 4+B at S340. Then, at S350, the wiping mode is lowered from the HI level to the LO level. After S350, the mode-down counter is cleared at step S360. Specifically, the counter value is set to zero. After S360, a driving signal for driving the wiper 12 at the LO level is output into the wiper controller 14, at step S150 in FIG. 4.

After S150, the controller 5 returns to S110. In this case, because the mode-down counter is cleared at S360, the counter value of the mode-down counter is to be increased from zero to one at the next-coming step S330.

In contrast, when the counter value of the mode-down counter is determined to be smaller than the predetermined number N (NO at S340), the wiping mode is kept the same at step S390. For example, when the wiper 12 operates at the HI level, the wiping mode is kept to be the HI level, and the controller 5 outputs the driving signal at the HI level into the wiper controller 14, at S150. After S150, the controller 5 returns to S110. Therefore, a process for keeping the wiping mode (S390) is repeated until when the counter value of the mode-down counter is determined to be equal to or larger than the predetermined number N (YES at S340).

That is, when the detected raindrop amount is continuously kept to be smaller than the first mode-keep threshold K1 while the wiper 12 performs the predetermined number N of the wiping operations, the controller 5 lowers the wiping mode. Thereby, the wiping operation of the wiper 12 can be stable. Further, the responsivity for lowering the wiping mode can be changed by the predetermined number N of the wiping operations. Further, the predetermined number N can be changed in accordance with the sense of the user, due to the mode-down map selection at S310.

For example, when the user sets the sensitivity volume to be the MAX level, the wiping operation can be stable, because the predetermined number N is set larger. In contrast, when the user sets the sensitivity volume to be the MIN level, the responsivity for lowering the wiping mode can be fast, because the predetermined number N is set smaller. That is, the responsivity for lowering the wiping mode can be changed in accordance with the sense of the user.

Here, when the user sets the sensitivity volume to be the MIN level, the predetermined number N is set smaller. In this case, because the wiping mode is set low relative to the same detected raindrop amount, the time period t1 (see FIG. 3B) for which the wiper 12 operates becomes short. Thus, the enabling time period TS secures to be increased. Therefore, the wiping operation can be kept stable relative to the same detected raindrop amount.

In addition, when the wiper 12 is determined to be stopped and when it is determined not to be raining (NO at S300), the wiper 12 is kept to be stopped at S350 and S390, and the above-described operation is similarly to be performed at this time. Thus, the wiping operation can be stable, and the reponsivity for lowering the wiping mode can be changed in accordance with the sense of the user.

Next, when the detected raindrop amount is determined to be equal to or larger than the first mode-keep threshold K1 (YES at S320), the mode-down counter is cleared at step S370. After S370, the detected raindrop amount is determined to be equal to or larger than the first mode-up threshold U1 or not, at step S380. The first mode-up threshold U1 is larger than the first mode-keep threshold K1. When the detected raindrop amount is determined to be smaller than the first mode-up threshold U1 (NO at S380), step S390 is performed.

When the detected raindrop amount is determined to be equal to or larger than the first mode-up threshold U1 (YES at S380), the wiping mode is raised at step S400. After S400, the driving signal for driving the wiper 12 at the raised wiping mode is output into the wiper controller 14, at S150. After S150, the controller 5 returns to S110.

When the wiper 12 is determined to be stopped and when the detected raindrop amount is determined to be equal to or larger than the rainfall determination threshold (YES at S300), the mode-down counter is cleared at step S410. After S410, an initial wiping mode is set at step S420. After S420, the driving signal for driving the wiper 12 at the set initial wiping mode is output into the wiper controller 14 at S150. After S150, the controller 5 returns to S110.

In addition, the mode-down map, e.g., MAP1, MAP2 or MAP3, shown in FIG. 8 may be changed without departing from the scope of the present disclosure. For example, the integer A may be set to zero. Further, in MAP5, the predetermined number N set for lowering the wiping mode from the HI level to the LO level may be set to three, or the predetermined number N set for lowering the wiping mode from the LO level to the INT-A level may be set to two.

(First Modification)

Figures 9, 10:
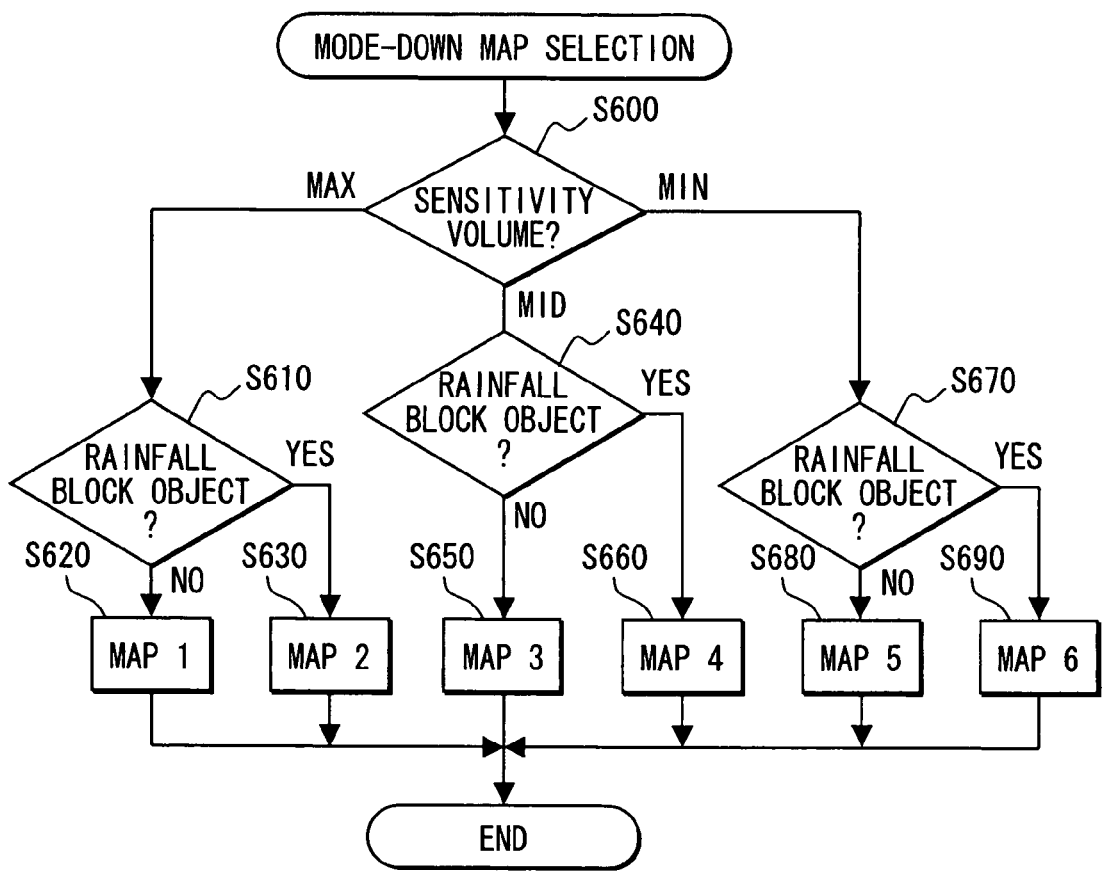
FIG. 9 is a flow chart showing a subroutine of a mode-down map selection according to a first modification of the embodiment.
FIG. 10 is a diagram showing a mode-down map of the first modification.

As shown in FIG. 9, step S610, S640 and S670 are added relative to the flow chart shown in FIG. 7. Step S610, S640 and S670 are performed based on the rainfall block data input at S220 in FIG. 5. Thereby, MAP2 at step S630, MAP4 at step S660 and MAP6 at step S690 are added. For example, when the sensitivity volume is determined to be the MIN level at step S600, a rainfall block object for blocking rainfall relative to the vehicle 10, e.g., tunnel, is determined to exist or not at step S670. When the vehicle 10 is determined not to enter the rainfall block object (NO at S670), MAP5 is selected at step S680, and the above-described advantage can be similarly provided.

In contrast, when the vehicle 10 is determined to enter the rainfall block object (YES at S670), a first determination data representing that the vehicle 10 enters the rainfall block object is input into the controller 5, and MAP6 is selected at S690.

As shown of MAP6 in FIG. 10, in order to stop the wiper 12 from the HI level, the predetermined number N of the wiping operations at the HI level is set to four minus an integer F (4−F) to change the wiper mode to the LO level. In order to stop the wiper 12 from the LO level, the predetermined number N of the wiping operations at the LO level is set to three minus the integer F (3−F) to change the wiper mode to the INT-A level. In order to stop the wiper 12 from the INT level, the predetermined number N of the wiping operations at the INT-B level is set to two minus the integer F (2−F) to change the wiping mode to the INT-C level. That is, the predetermined number N in MAP6 is set by subtracting the integer F from the predetermined number N in MAP5. Similarly, the predetermined number N in MAP4 is set by subtracting an integer E from the predetermined number N in MAP3, and the predetermined number N in MAP2 is set by subtracting an integer D from the predetermined number N in MAP1.

Because the predetermined number N is decreased based on the above-described first determination data, the responsivity for lowering the wiping mode can be made faster when the vehicle 10 enters the rainfall block object. For example, the wiper 12 can be stopped faster (earlier) at a tunnel entrance.

Here, the integer D, the integer E and the integer F are set to have a relationship D>E=F>0, for example. That is, the decreasing number of the predetermined number N based on the first determination data is changed based on the sensitivity data. Thereby, the responsivity for lowering the wiping mode can be made faster in accordance with the sense of the user when the vehicle 10 enters the rainfall block object.

In the first modification, the predetermined number N is set based on both of the sensitivity volume data and the rainfall block data. However, the predetermined number N may be set based on only the rainfall block data.

(Second Modification)

Figure 11:
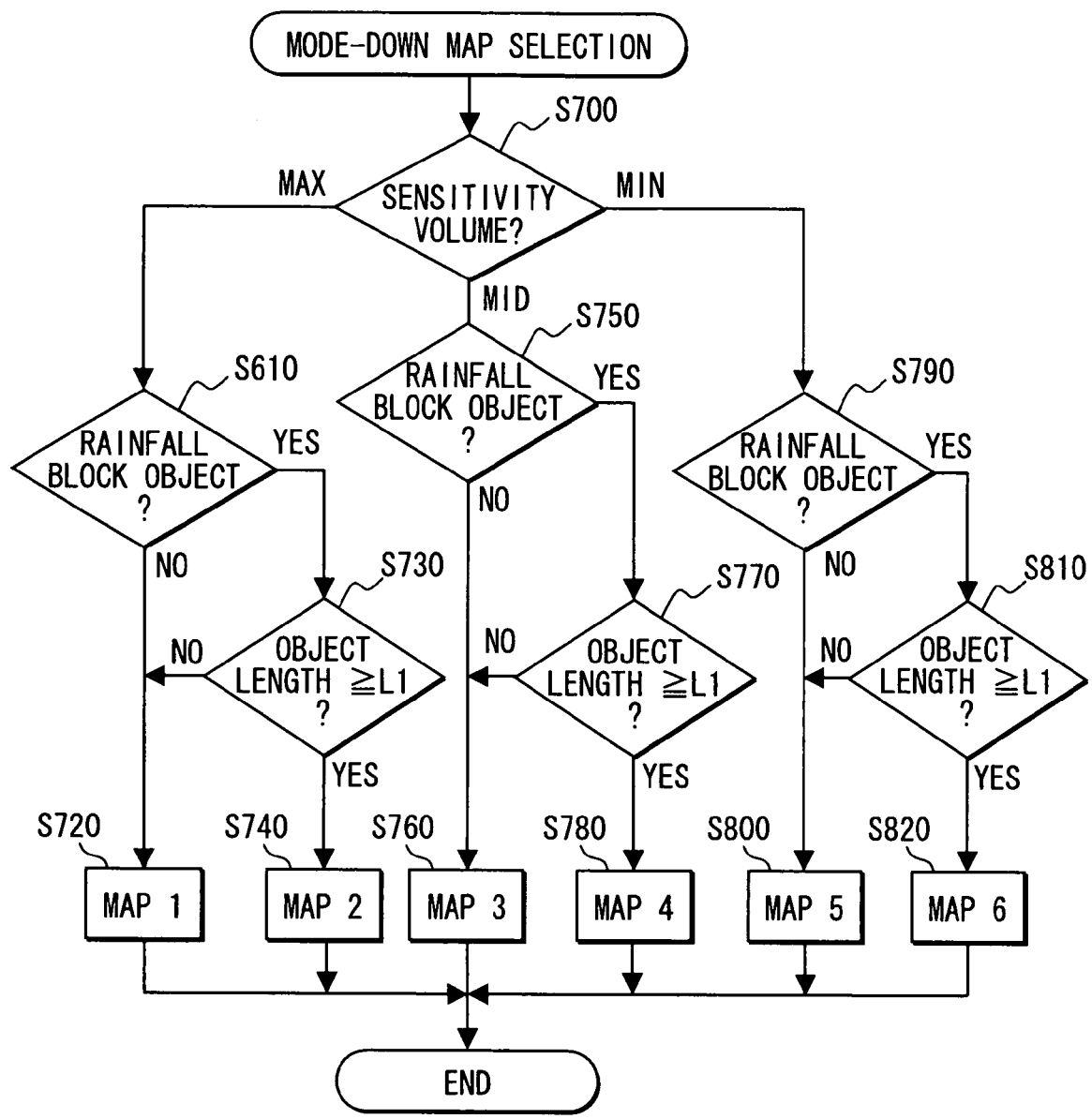
FIG. 11 is a flow chart showing a subroutine of a mode-down map selection according to a second modification of the embodiment.

As shown in FIG. 11, step S730, S770 and S810 are added relative to the flow chart shown in FIG. 9. For example, when the sensitivity volume is determined to be the MIN level at step S700, and when the rainfall block object is determined to exist at step S790, a length (distance) of the rainfall block object is determined to be equal to or larger than a predetermined length L1, e.g., 30 m, or not, at step S810. When the length of the rainfall block object is determined to be smaller than the predetermined length L1 (NO at S810), a second determination data representing that the length of the rainfall block object is smaller than the predetermined length L1 is input into the controller 5, and MAP5 is selected at step S800. Thus, the advantage described with reference to FIG. 7 can be similarly provided.

In contrast, when the length of the rainfall block object is determined to be equal to or larger than the predetermined length L1 (YES at S810), MAP6 is selected at step S820, and the advantage described with reference to FIG. 9 can be similarly provided.

That is, when the length of the rainfall block object is determined to be smaller than the predetermined length L1, the predetermined number N is not decreased when the vehicle 10 enters the rainfall block object. For example, when the vehicle 10 travels under a bridge with a structural frame, and when a length of the bridge is smaller than 30 m, the rainfall-blocked condition may be short for the vehicle 10. In this case, the predetermined number N is not needed to be decreased. In addition, the predetermined length L1 may be any length without departing from the scope of the present disclosure.

(Third Modification)

A predetermined number M of the raindrop amounts may be successively detected, and an average of the detected raindrop amounts may be calculated. The controller 5 lowers the wiping mode when the average is smaller than a second mode-keep threshold K2, which may be different from the first mode-keep threshold K1. In the third modification, the predetermined number M is used in an average-using map, in place of the predetermined number N in the mode-down map of FIGS. 6, 8 and 10. The predetermined number M is set based on at least one of the sensitivity volume data and the rainfall block data.

Figure 12:
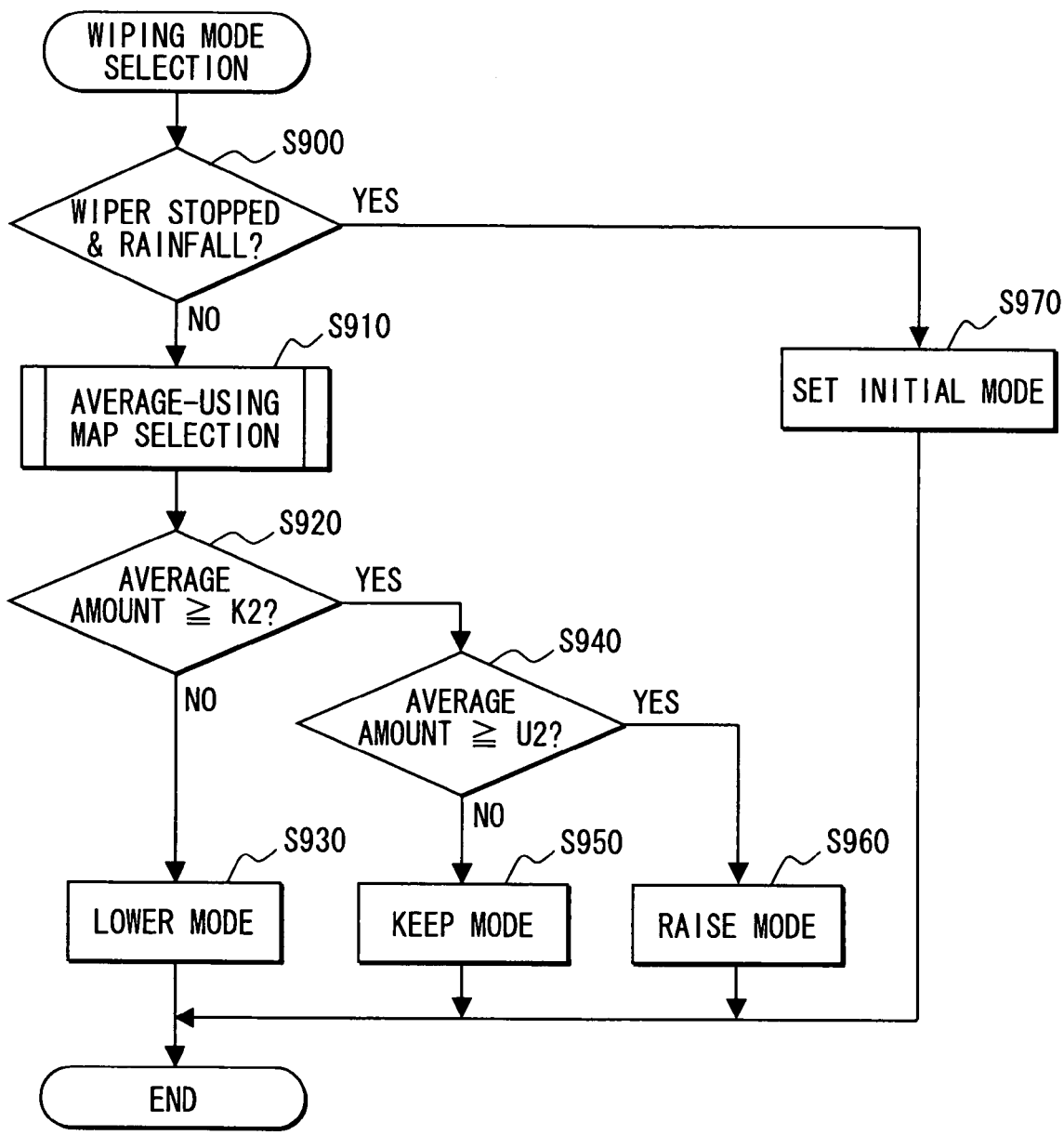
FIG. 12 is a flow chart showing a subroutine of a wiping mode selection according to a third modification of the embodiment.

Specifically, the wiping mode selection at S140 in FIG. 4 is constructed by step S900-S970 shown in FIG. 12. At step S900, the wiper 12 is determined to be stopped or not, and it is determined to be raining or not. When the wiper 12 is determined to be operating or when it is determined not to be raining while the wiper 12 is determined to be stopped (NO at S900), the average-using map is selected at step S910.

A process of selecting the average-using map (S910) is constructed with step S500, S510, S520 and S530 shown in FIG. 7. The predetermined number M is used in place of the predetermined number N in FIG. 8. After S910, the raindrop amount is determined to be equal to or larger than a predetermined amount for keeping the wiping mode, at step S920. Specifically, the predetermined number M of the raindrop amounts is successively detected, and an average of the detected raindrop amounts is calculated. Then, the average is determined to be equal to or larger than the second mode-keep threshold K2 or not, at step S920.

When the average is determined to be smaller than the second mode-keep threshold K2 (NO at S920), the wiping mode is lowered at step S930. Then, the driving signal for driving the wiper 12 is output into the wiper controller 14 at step S150 in FIG. 4. After S150, the controller 5 returns to step S110.

Thus, the wiping operation of the wiper 12 can be stable. Further, the responsivity for lowering the wiping mode can be changed by the predetermined number M of the detected raindrop amounts. Furthermore, the predetermined number M can be changed in accordance with the sense of the user, due to the average-using map selection at S910.

When the average is determined to be equal to or larger than the second mode-keep threshold K2 (YES at S920), the average is determined to be equal to or larger than a second mode-up threshold U2 or not at step S940. The second mode-up threshold U2 is larger than the second mode-keep threshold K2. When the average is determined to be smaller than the second mode-up threshold U2 (NO at S940), step S950 is performed.

When the average is determined to be equal to or larger than the second mode-up threshold U2 (YES at S940), the wiping mode is raised at step S960. After S950 or S960, the driving signal for driving the wiper 12 is output at S150 in FIG. 4, and the controller 5 returns to S110. In addition, the second mode-keep threshold K2 and the second mode-up threshold U2 are set at S120 in FIG. 4.

When the wiper 12 is determined to be stopped and when the detected raindrop amount is determined to be equal to or larger than the rainfall determination threshold (YES at S900), an initial wiping mode is set at step S970. After S970, the controller 5 outputs the driving signal for driving the wiper 12 at the set initial wiping mode into the wiper control 14 at S150 in FIG. 4, and the controller 5 returns to S110.

In addition, when the average-using map shown in FIG. 9 is selected at S910, the predetermined number M may be set based on the rainfall block data. Further, when the average-using map shown in FIG. 11 is selected at S910, the predetermined number M is restricted from decreasing, because the vehicle is predicted to return a rainfall condition after a relatively short time. Thus, according to the modifications, the above-described advantage can be similarly provided.

Further, the rainfall block data may be provided by a light sensor (light-receiving sensor) in place of the navigation ECU 17. When the vehicle 10 includes the light sensor for detecting two directions, i.e., traveling direction and upward direction, the length of the rainfall block object can be determined by the light sensor.

Further, the rain sensor 1 is not limited to the above-described optical rain sensor. Alternatively, a capacitive rain sensor may be used as the rain sensor 1, in which a capacitance is varied in accordance with the raindrop amount.

Thus, the rain sensor 1, i.e., raindrop detecting device, detects the raindrop amount on the front windshield 11 of the vehicle 10. The rain sensor 1 selects the wiping mode of the wiper 12 based on the detected raindrop amount. The rain sensor 1 includes the controller 5 for lowering the wiping mode when the detected raindrop amount is kept to be smaller than the first mode-keep threshold K1 while the wiper performs the predetermined number N of the wiping operations. The controller 5 changes the predetermined number N based on the sensitivity volume data output from the sensitivity volume switch 152 for adjusting the relationship between the detected raindrop amount and the wiping mode.

Thereby, the wiping operation of the wiper 12 can be stable, and the responsivity for lowering the wiping mode can be changed in accordance with the sense of the user.

Such changes and modifications are to be understood as being within the scope of the present invention as defined by the appended claims.

What is claimed is:

1. A raindrop detecting device for detecting a raindrop amount on a windshield of a vehicle and selecting a wiping mode of a wiper based on the detected raindrop amount, the device comprising:
    a controller for lowering the wiping mode from a higher frequency to a lower frequency when the detected raindrop amount is kept to be smaller than a mode-keep threshold while the wiper performs a predetermined number of wiping operations of the higher frequency, wherein
    the controller allows the lowering of the wiping mode from the higher frequency to the lower frequency only after the predetermined number of wiping operations of the higher frequency is finished, and
    the controller changes the predetermined number of wiping operations of the higher frequency based on at least one of a sensitivity data of a user of the vehicle and a rainfall block data relative to the vehicle.

2. The raindrop detecting device according to claim 1, further comprising:
    a sensitivity adjuster for adjusting a relationship between the detected raindrop amount and the wiping mode, wherein
    the sensitivity adjuster outputs the sensitivity data.

3. The raindrop detecting device according to claim 1, further comprising:
    a determiner for determining the vehicle to enter a rainfall-blocked area or not, wherein
    the determiner outputs a first determination data that represents that the vehicle enters the rainfall-blocked area as the rainfall block data, and
    the controller decreases the predetermined number of wiping operations based on the first determination data.

4. The raindrop detecting device according to claim 3, wherein the controller changes a number of the decreasing based on the sensitivity data.

5. The raindrop detecting device according to claim 3, wherein
    the determiner outputs a second determination data that represents a length of the rainfall-blocked area in a traveling direction of the vehicle is smaller than a predetermined value, and
    the controller disables to decrease the predetermined number of wiping operations based on the second determination data.

6. The raindrop detecting device according to claim 1, wherein the controller disables changing the wiping mode from the higher frequency to the lower frequency before the predetermined number of wiping operations of the higher frequency is finished, if the detected raindrop amount becomes smaller than the mode-keep threshold.

7. The raindrop detecting device according to claim 1, wherein the controller changes the predetermined number of wiping operations of the higher frequency based on the sensitivity data, the sensitivity data being adjustable by the user.

8. A raindrop detecting device for detecting a raindrop amount on a windshield of a vehicle and selecting a wiping mode of a wiper based on the detected raindrop amount, the device comprising:
    a controller for calculating an average of a predetermined number of the detected raindrop amounts, and lowering the wiping mode from a higher frequency to a lower frequency when the average is smaller than a mode-keep threshold, wherein
    the controller allows the lowering of the wiping mode from the higher frequency to the lower frequency only after the predetermined number of the detected raindrop amounts is finished, and
    the controller changes the predetermined number of the detected raindrop amounts based on a sensitivity data of a user of the vehicle and a rainfall block data relative to the vehicle.

9. The raindrop detecting device according to claim 8, further comprising:
    a sensitivity adjuster for adjusting a relationship between the detected raindrop amount and the wiping mode, wherein
    the sensitivity adjuster outputs the sensitivity data.

10. The raindrop detecting device according to claim 9, wherein the controller changes a number of the decreasing based on the sensitivity data.

11. The raindrop detecting device according to claim 8, further comprising:
    a determiner for determining the vehicle to enter a rainfall-blocked area, wherein
    the determiner outputs a first determination data that represents that the vehicle enters the rainfall-blocked area as the rainfall block data, and
    the controller decreases the predetermined number of the detected raindrop amounts based on the first determination data.

12. The raindrop detecting device according to claim 11, wherein
   the determiner outputs a second determination data that represents a length of the rainfall-blocked area in a traveling direction of the vehicle is smaller than a predetermined value, and
   the controller disables to decrease the predetermined number of wiping operations based on the second determination data.

13. The raindrop detecting device according to claim 8, wherein the controller disables changing the wiping mode from the higher frequency to the lower frequency before the predetermined number of wiping operations of the higher frequency is finished, if the detected raindrop amount becomes smaller than the mode-keep threshold.

14. The method according to claim 8, further comprising:
   adjusting a relationship between the detected raindrop amount and the wiping mode, and outputting the sensitivity data.

15. The method according to claim 8, further comprising:
   determining the vehicle to enter a rainfall-blocked area or not, wherein outputting a first determination data that represents that the vehicle enters the rainfall-blocked area as the rainfall block data, and
   decreasing the predetermined number of wiping operations based on the first determination data.

16. The method according to claim 15, further comprising changing a number of the decreasing based on the sensitivity data.

17. The method according to claim 15, further comprising
   outputting a second determination data that represents a length of the rainfall-blocked area in a traveling direction of the vehicle is smaller than a predetermined value, and
   disabling decrease of the predetermined number of wiping operations based on the second determination data.

18. The raindrop detecting device according to claim 8, wherein the controller changes the predetermined number of wiping operations of the higher frequency based on the sensitivity data, the sensitivity data being adjustable by the user.

19. A method of selecting a wiping mode of a wiper for a vehicle, the method comprising:
   detecting a raindrop amount on a windshield of the vehicle;
   lowering the wiping mode from a higher frequency to a lower frequency when the detected raindrop amount is kept to be smaller than a mode-keep threshold while the wiper performs a predetermined number of wiping operations of the higher frequency;
   allowing the lowering of the wiping mode from the higher frequency to the lower frequency only after the predetermined number of wiping operations of the higher frequency is finished; and
   changing the predetermined number of wiping operations of the higher frequency based on at least one of a sensitivity data of a user of the vehicle and a rainfall block data relative to the vehicle.

20. The method according to claim 19, further comprising:
   calculating an average of a predetermined number of the detected raindrop amounts, wherein
   the changing is performed relative to the predetermined number of the detected raindrop amounts.

21. The method according to claim 20, wherein the predetermined number of wiping operations of the higher frequency is changed based the sensitivity data, the sensitivity data being adjustable by the user.

22. The method according to claim 19, wherein changing the wiping mode from the higher frequency to the lower frequency is disabled before the predetermined number of wiping operation of the higher frequency is finished, if the detected raindrop amount becomes smaller than the mode-keep threshold.

* * * * *